United States Patent
Park et al.

(10) Patent No.: US 7,398,459 B2
(45) Date of Patent: Jul. 8, 2008

(54) PARITY STORING METHOD AND ERROR BLOCK RECOVERING METHOD IN EXTERNAL STORAGE SUBSYSTEM

(75) Inventors: Hyun-ho Park, Yongin (KR); Sang-won Oh, Seoul (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 442 days.

(21) Appl. No.: 10/693,986

(22) Filed: Oct. 28, 2003

(65) Prior Publication Data

US 2004/0153961 A1 Aug. 5, 2004

(30) Foreign Application Priority Data

Jan. 20, 2003 (KR) .................... 2003-3764

(51) Int. Cl.
 H03M 13/00 (2006.01)
 G06F 11/00 (2006.01)

(52) U.S. Cl. ...................... 714/800; 714/770

(58) Field of Classification Search ............... 714/770, 714/800; 711/114, 203
 See application file for complete search history.

(56) References Cited

U.S. PATENT DOCUMENTS

| 4,665,537 | A  | * | 5/1987 | Moriyama ............... 714/755 |
| 5,710,546 | A  | * | 1/1998 | Leitch .................. 340/7.25 |
| 5,933,592 | A  | * | 8/1999 | Lubbers et al. ............ 714/6 |
| 6,185,665 | B1 | * | 2/2001 | Owada et al. ............. 711/170 |
| 6,330,642 | B1 |   | 12/2001 | Carteau |
| 6,351,838 | B1 | * | 2/2002 | Amelia ................. 714/770 |
| 2005/0021888 | A1 | * | 1/2005 | Yatziv et al. ............. 710/52 |
| 2005/0033935 | A1 | * | 2/2005 | Manbert et al. .......... 711/170 |

FOREIGN PATENT DOCUMENTS

| JP | 10-133828 | 5/1989 |
| JP | 9-16343 | 1/1997 |
| JP | 10-198528 | 7/1998 |
| JP | 2000-148409 | 5/2000 |
| JP | 2000-259359 | 9/2000 |
| JP | 2000-276308 | 10/2000 |
| KR | 2000-64410 | 11/2000 |

OTHER PUBLICATIONS

Japanese Office Action issued by the Japanese Patent Office in Japanese patent application No. 2003-355186 related to the present above-identified pending US patent application on Nov. 1, 2005, 1 page.

* cited by examiner

*Primary Examiner*—Guy J. Lamarre
(74) *Attorney, Agent, or Firm*—Staas & Halsey LLP

(57) ABSTRACT

Storing parity information in an external storage with multiple disk drives by determining the number of the storage blocks used as data blocks and the number of the storage blocks used as parity blocks; forming a three-dimensional block matrix of virtual data blocks corresponding to the determined number of the storage blocks; allocating virtual parity blocks to the virtual data block planes; allocating the virtual data blocks and the virtual parity blocks to the storage blocks; calculating parity information based upon data bits respectively stored in the storage blocks corresponding to the virtual data blocks of every virtual data block plane; and storing the calculated parity information in the storage blocks corresponding to the virtual parity blocks. The stored parity information allows any number of error blocks to be recovered, and more particularly allow three or more error blocks per one parity group to be recovered.

23 Claims, 9 Drawing Sheets

PARITY STORING METHOD AND ERROR BLOCK RECOVERING METHOD IN EXTERNAL STORAGE SUBSYSTEM

CROSS-REFERENCE TO RELATED APPLICATIONS

This application claims the benefit of Korean Patent Application No. 2003-3764, filed Jan. 20, 2003, in the Korean Intellectual Property Office, the disclosure of which is incorporated herein by reference.

BACKGROUND OF THE INVENTION

1. Field of the Invention

The present invention relates to a parity storing method and an error block recovering method in an external storage subsystem, and more particularly to a parity storing method and an error block recovering method in an external storage subsystem, which improve recovering multiple error blocks.

2. Description of the Related Art

RAID (redundant array of independent disks) combines multiple disk drives having a plurality of storage blocks into a single logical disk drive, thereby providing large storage capacity, improving accessing speed, etc.

There are various types of RAID, for example, RAID level-0 through RAID level-5, which are classified according to an array structure and an array characteristic. In the RAID level-4 and the RAID level-5, several storage blocks are grouped into a striping block according to predetermined rule, and a parity block is provided for storing therein parity information based on a data group stored in each striping block, thereby allowing an error block to be recovered.

Recently, as the amount of data to be processed has increased, a plurality of error blocks can occur due to a disk failure, a reading error, etc. However, in the case of the RAID level-4 and the RAID level-5, the number of recoverable error blocks is limited to only one per one parity group in the same striping block.

To overcome the above shortcoming of the RAID level-4 and RAID level-5, various parity storing methods have been proposed, such as RAID level-6 using a Reed-Solomon code, an EVENODD method using a row parity group and a diagonal parity group, etc. However, in these proposed parity storing methods, it is impossible to recover three or more error blocks per one parity group.

SUMMARY OF THE INVENTION

Accordingly, the present invention provides a parity storing method and an error block recovering method in an external storage subsystem, which allow a plurality of error blocks to be recovered, and more particularly allow three or more error blocks per one parity group to be recovered.

Additional aspects and advantages of the invention will be set forth in part in the description which follows and, in part, will be obvious from the description, or may be learned by practice of the invention.

The foregoing and/or other aspects of the present invention may be achieved by providing a parity storing method in an external storage subsystem comprising multiple disk drives including a plurality of storage blocks, the method comprising determining a number of the storage blocks to be used as data blocks and a number of the storage blocks to be used as parity blocks in total storage blocks of the disk drives; forming a three-dimensional block matrix constructed by virtual data blocks corresponding to the determined number of the storage blocks to be used as the data block on Cartesian coordinates (X, Y, Z); allocating virtual parity blocks to virtual data block planes related to the X, Y and Z-coordinates of the constructed three-dimensional block matrix, respectively; allocating the virtual data blocks and the virtual parity blocks to the storage blocks of the disk drives, respectively; calculating parity information based upon data bits respectively stored in the storage blocks corresponding to the virtual data blocks of every block plane; and storing the calculated parity information in the storage blocks corresponding to the virtual parity blocks for every virtual data block plane, respectively.

According to an aspect of the invention, the number of the storage blocks to be used as data blocks and the number of the storage blocks to be used as parity blocks are determined by calculating the maximum integer M satisfying $K \geq M^3 + 3M$, where K is the number of the total storage blocks of the disk drives, so that the number of the data block is defined as $M^3$ and the number of the parity blocks is defined as $3M$ and the three-dimensional block matrix is a type of "M×M×M".

According to an aspect of the invention, the allocating of the virtual data blocks and the virtual parity blocks to the storage blocks of the disk drives is performed by allocating the virtual parity block for the each virtual data block plane to the storage block of the disk drive after the virtual data blocks belonging to each block plane are completely allocated to the storage blocks of the disk drives.

According to an aspect of the invention, the calculating of the parity information is performed by a bitwise operator performing an exclusive OR (XOR) operation between the data bits stored in the storage blocks corresponding to the virtual data blocks of each block plane.

The present invention may be also achieved by a method of recovering an error block in an external storage subsystem comprising multiple disk drives including a plurality of storage blocks, the method comprising storing data and parity information according to the parity storing method of the present invention; and recovering a plurality of error blocks by using parity blocks corresponding to the virtual parity blocks related to the respective block planes of X, Y and Z-coordinates.

According to an aspect of the invention, the recovering of the plurality of error blocks comprises counting a total numbers of the error blocks occurring in the virtual data block planes, respectively; skipping the present process to the next process when no error block occurs or two or more error blocks occur therein, and performing an exclusive OR (XOR) operation between the data bits stored in the storage blocks corresponding to the virtual data blocks belonging to the block plane, except for the error block, when one error block occurs; recovering the error block by comparing XOR operation results with the parity information stored in the storage block corresponding to the virtual parity block for the virtual data block plane; and repeating the above recovering operations in a regular order of X, Y and Z-coordinates.

BRIEF DESCRIPTION OF THE DRAWINGS

The above and/or other aspects and advantages of the present invention will become apparent and more readily appreciated from the following description of the embodiments, taken in conjunction with the accompanying drawings of which.

DETAILED DESCRIPTION OF THE PREFERRED EMBODIMENTS

Figure 1:
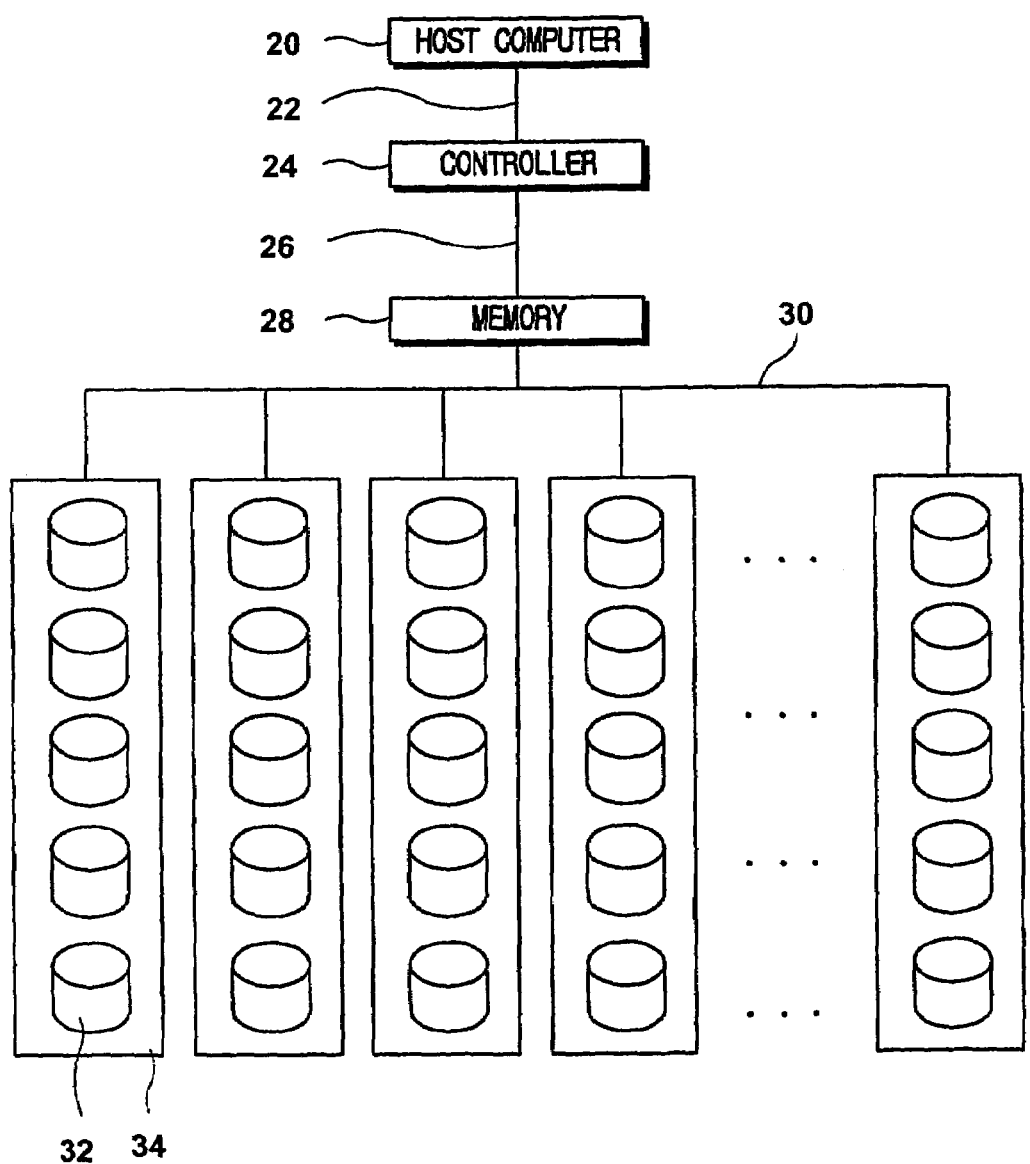
FIG. 1 is a block diagram of an external storage subsystem, according to an embodiment of the present invention.

Reference will now be made in detail to the embodiments of the present invention, examples of which are illustrated in the accompanying drawings, wherein like reference numerals refer to like elements throughout. The embodiments are described below in order to explain the present invention by referring to the figures.

FIG. 1 is a block diagram of an external storage subsystem, according to an embodiment of the present invention. As shown in FIG. 1, an external storage subsystem according to the present invention comprises a host computer 20 processing data and requesting data input/output of disk drives; a controller 24 controlling RAID operations, such as the data input/output of the disk drives, and calculating a parity, etc.; a memory 28 functioning as a cache used for a quick disk drive access; and multiple disk drives 34 each including a plurality of storage blocks 32 storing the data and the calculated parity information. Typically, the host computer 20 and the controller 24 are connected by an interface 22, such as SCSI (small computer system interface) or a fibre channel. Further, typically, the controller 24 and the memory 28 are connected by an interface 26, which may be similar to the interface 22. Further, typically, the memory 28 and the disk drives 34 are connected by an interface 30, which may be similar to the interfaces 22 and 26.

Figure 2:
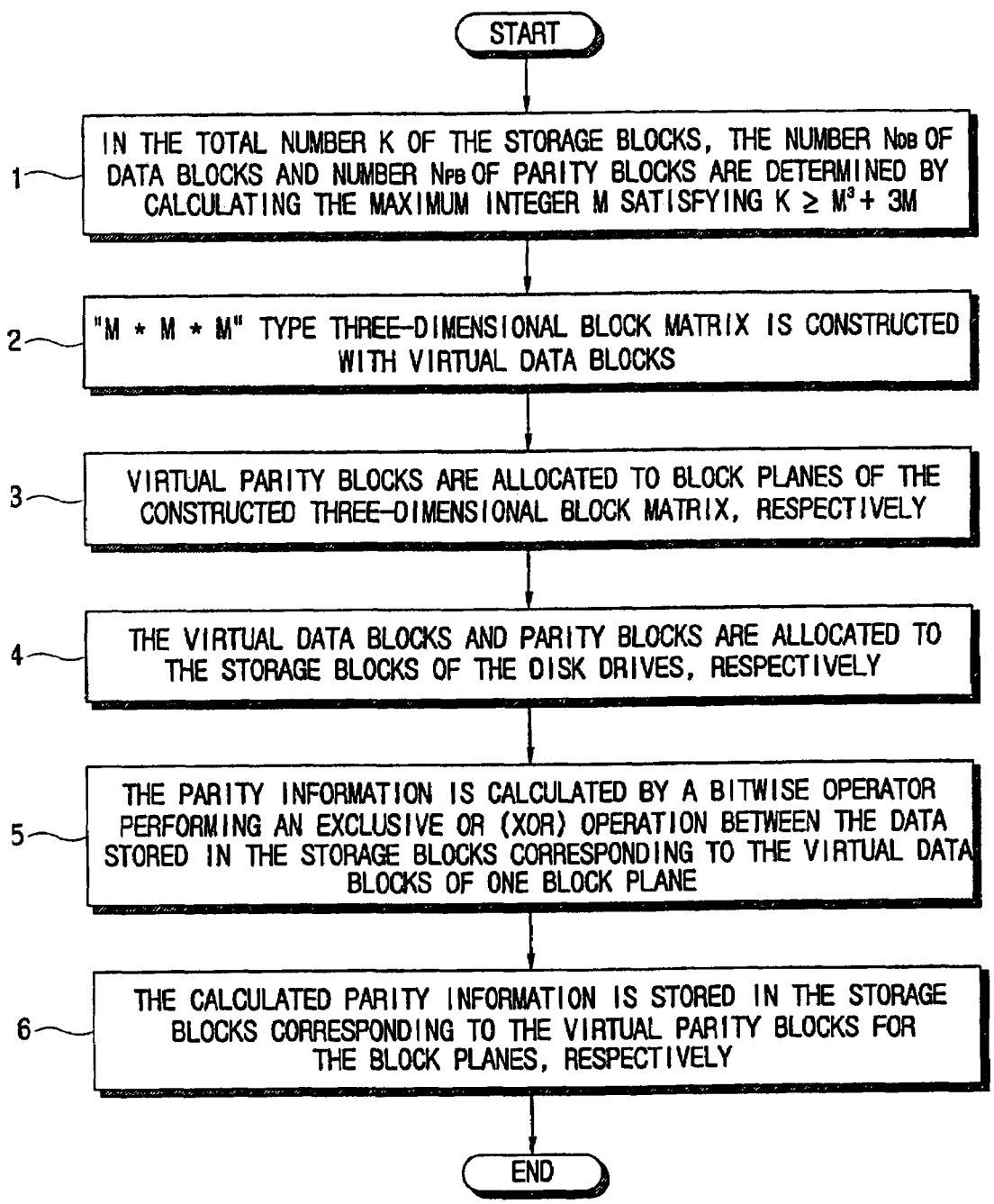
FIG. 2 is a flowchart of storing parity information, according to an embodiment of the present invention.

FIG. 2 is a flowchart of storing parity information, according to an embodiment of the present invention. Operation 1 determines, within the total number K of the storage blocks 32 of the disk drives 34, the number $N_{DB}$ of the storage blocks to be used as data blocks and the number $N_{PB}$ of the storage blocks to be used as parity blocks. That is, a maximum integer M satisfying $K \geq M^3 + 3M$ is calculated, and the number $N_{DB}$ of the data block is defined as $M^3$ and the number $N_{PB}$ of the parity blocks is defined as 3M.

Figure 7:
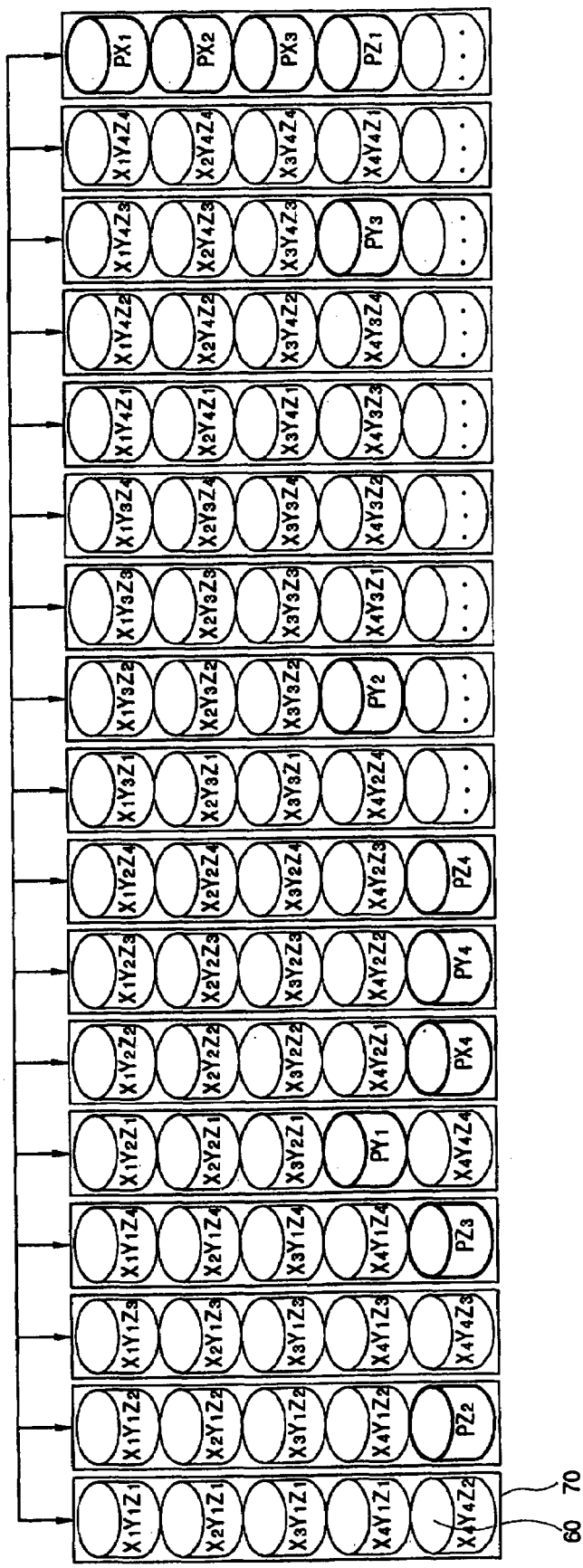
FIG. 7 exemplarily illustrates an array of the virtual parity blocks and the virtual data blocks allocated to storage blocks of disk drives.

For example, as shown in FIG. 7, if there are seventeen disk drives 70 and each disk drive 70 has five storage blocks 60, the total number K of the storage blocks is 85. In this case, M is 4 satisfying the foregoing $K \geq M^3 + 3M$ relational expression, so that the number $N_{DB}$ of the storage blocks to be used as the data blocks is 64 (i.e., $4^3$) and the number $N_{PB}$ of the storage blocks to be used as the parity block is 12 (i.e., 4×3).

Figure 3:
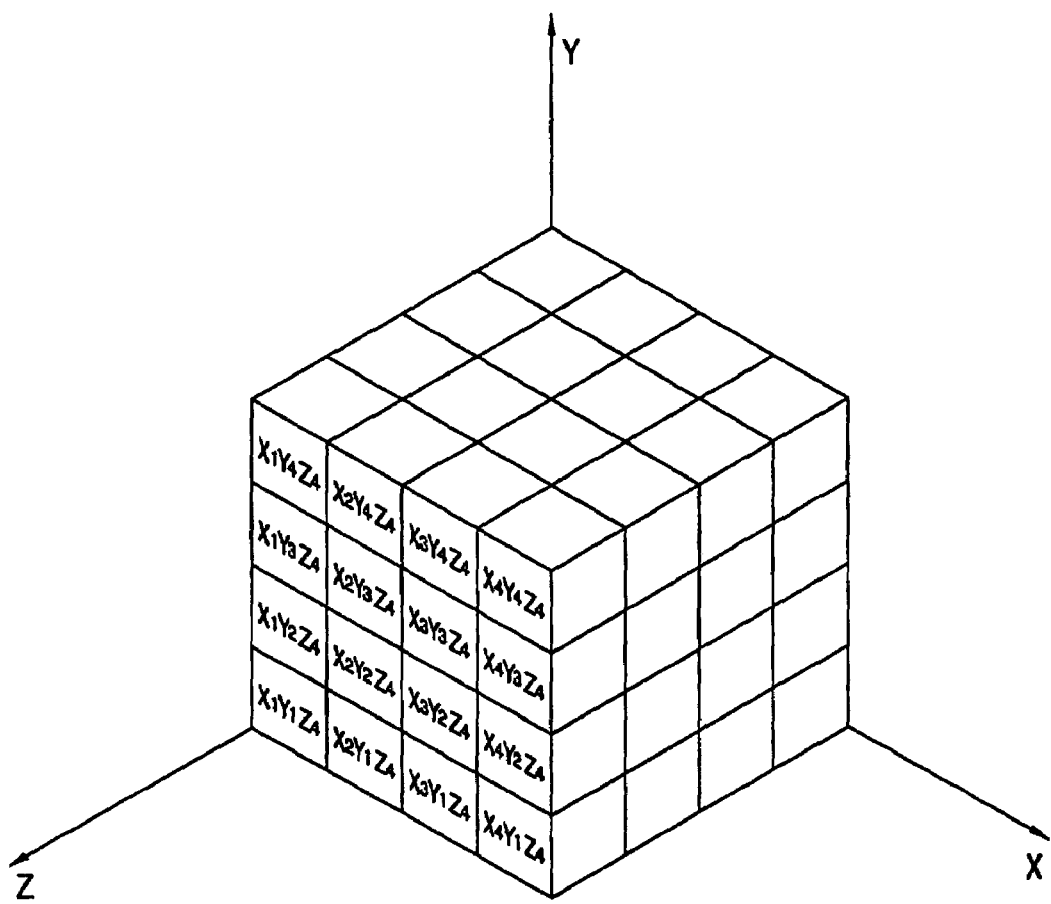
FIG. 3 is a three-dimensional block matrix diagram, according to an embodiment of the present invention.

As shown in FIG. 3, operation 2 forms a three-dimensional block matrix constructed with virtual data blocks on Cartesian coordinates (X, Y, Z) in correspondence to the calculated number $N_{DB}$ of the storage blocks to be used as the data blocks. In FIG. 3, coordinate marks are shown on some virtual data blocks to distinguish the virtual data blocks from one another. Typically, the appended numerals adjacent to the coordinate marks, as shown in FIG. 3, are given according to general three dimensional coordinate numbering.

Figure 4:
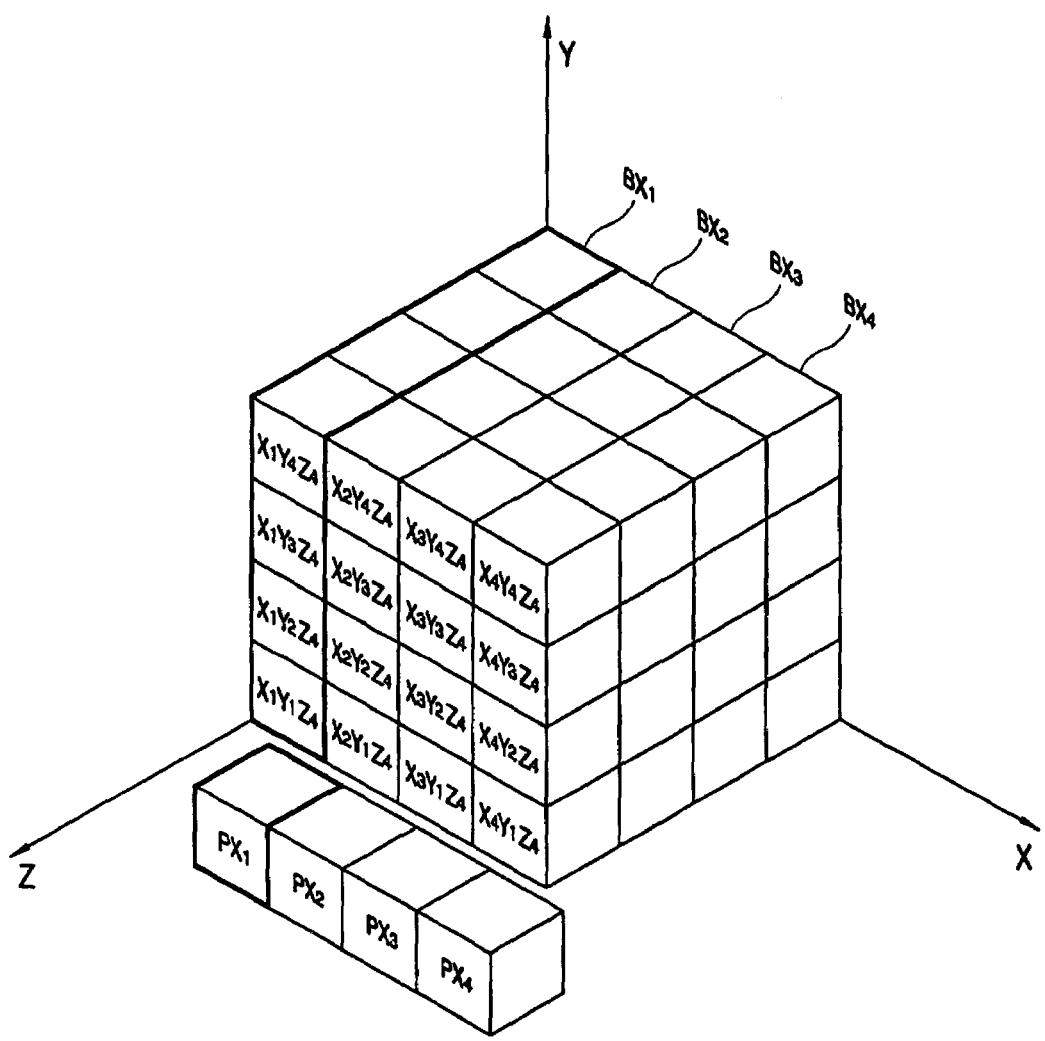
FIGS. 4 through 6 exemplarily illustrate allocating virtual parity blocks to respective virtual data block planes of the three-dimensional block matrix, according to an embodiment of the present invention.
Figure 5:
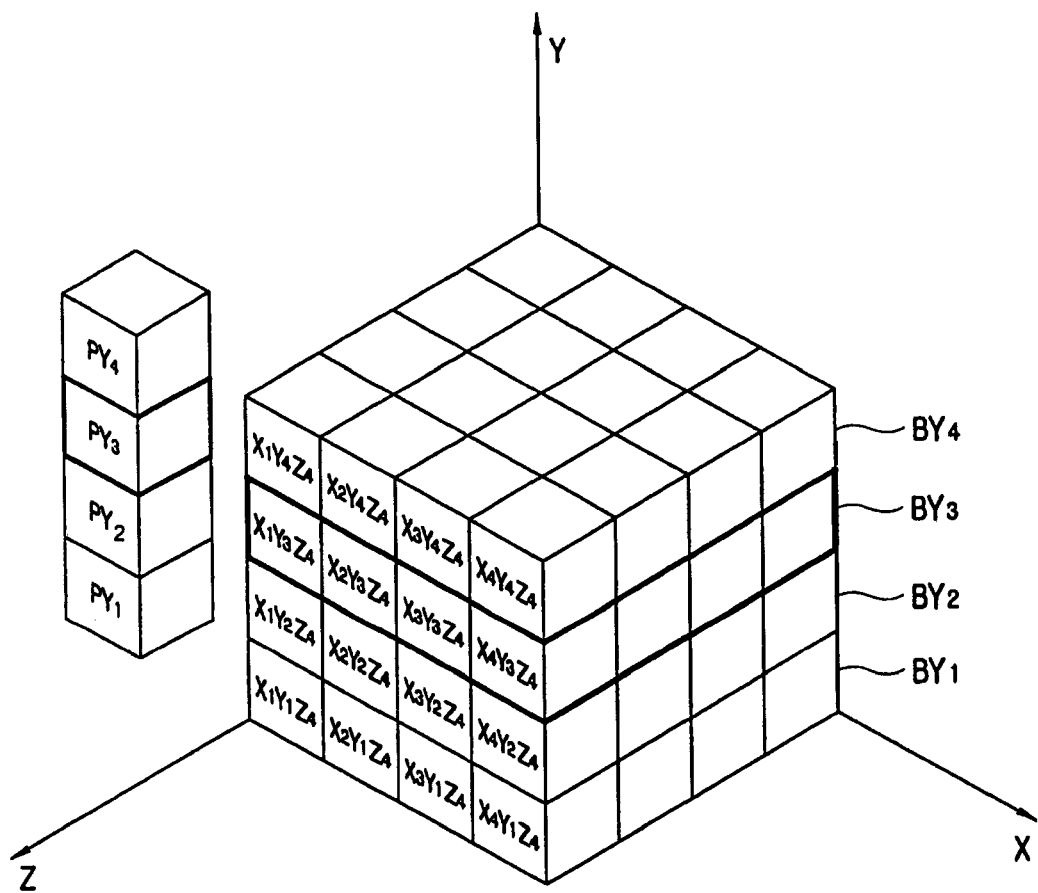
Figure 6:
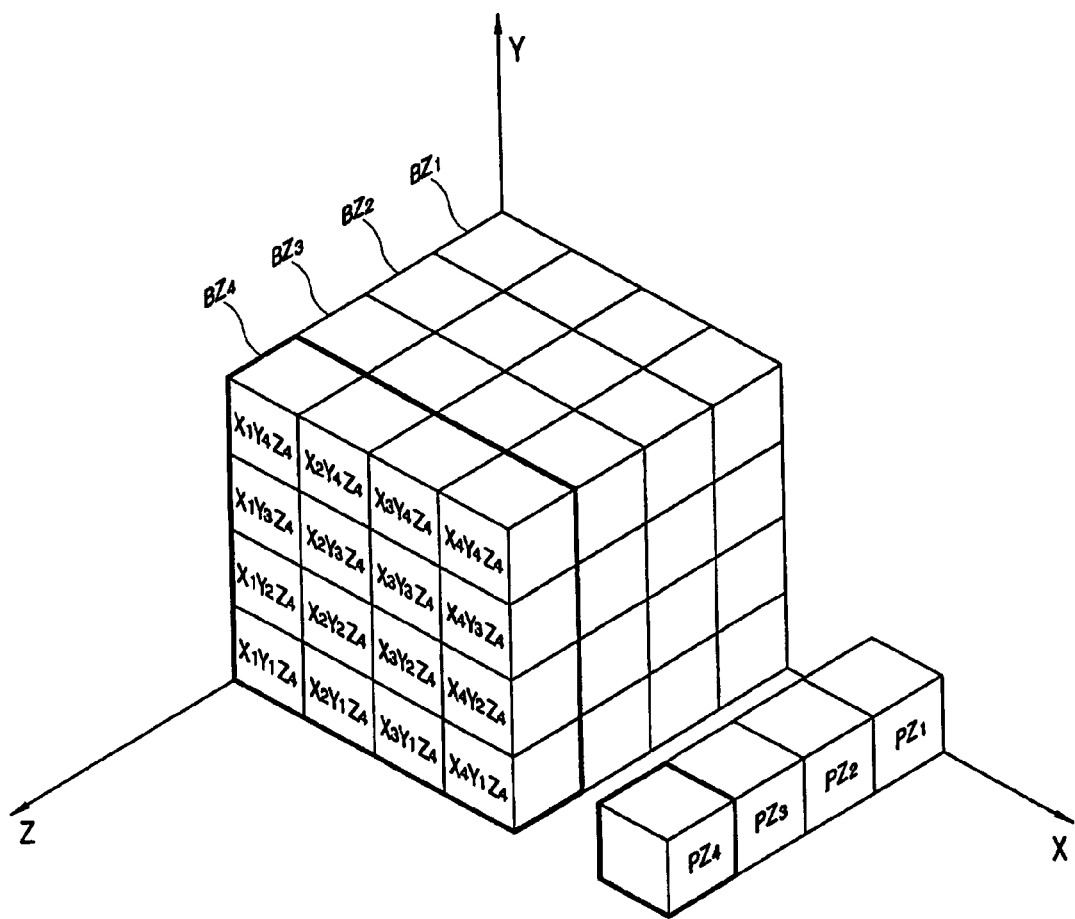

At operation 3, virtual parity blocks are allocated to virtual data block planes of the constructed three-dimensional block matrix, respectively. Hereinbelow, allocation of the virtual parity blocks will be described with reference to FIGS. 4 through 6. As shown in FIGS. 4, 5 and 6, the block plane formed by the virtual data blocks belonging to one X-coordinate (e.g., $X_i$, where "i" is an arbitrary integer) will be represented by $BX_i$, and the block planes formed by the virtual data blocks respectively belonging to one Y-coordinate and one Z-coordinate will be represented in the same manner.

FIG. 4 exemplarily illustrates allocating the virtual parity block $PX_i$ to the virtual data block plane $BX_i$ according to an embodiment of the present invention. As shown in FIG. 4, the virtual parity block $PX_1$ is allocated to the virtual block plane $BX_1$ designated by a bold line, wherein the block plane $BX_1$ means all virtual data blocks belonging to the $X_1$-coordinate. Further, the virtual parity blocks $PX_2$, $PX_3$ and $PX_4$ are allocated to the virtual data block planes $BX_2$, $BX_3$ and $BX_4$ parallel with the virtual data block plane $BX_1$, respectively. However, the virtual parity blocks may also be further allocated to an arbitrary virtual data block provided in the Cartesian coordinates (X, Y, Z) but not used as a virtual data block. FIGS. 5 and 6 illustrate allocating the virtual parity blocks $PY_i$ and $PZ_i$ to the virtual data block planes $BY_i$ and $BZ_i$, respectively. The virtual parity blocks $PY_i$ and $PZ_i$ are allocated in the same manner as the virtual parity block $PX_i$, and therefore repetitive descriptions are omitted.

At operation 4, the virtual data and parity blocks created through the operations 2 and 3 are allocated to the storage blocks of the disk drives, respectively. The process of allocating the virtual data and parity blocks to the storage blocks of the disk drives will be described with reference to FIGS. 3 through 7. As shown in FIG. 7, the external storage subsystem comprises seventeen disk drives 70 each having five storage blocks 60. In FIG. 7, the storage blocks 60 arrayed in columns are provided in one disk drive 70. Coordinate marks shown on the respective storage blocks 60 designate the same coordinate marks shown in the three-dimensional block matrix shown in FIGS. 3 through 6.

Typically, the virtual data blocks belonging to the block plane $BX_1$ are allocated to the storage blocks 60 of the respective disk drives 70 one by one, and then the virtual parity block $PX_1$ for the block plane $BX_1$ is allocated to the next storage block 60. Thereafter, the allocation of the block planes $BX_2$ and $BX_3$ is performed in the same manner. Typically, as shown in FIG. 7, the coordinate of the virtual data block is increased in value from a base value (e.g., 1) for the Z-coordinate related to one Y-coordinate until the increment is completed, and then the Z-coordinate is reset to the base value and similarly increased in value as related to the next Y-coordinate until the increment is completed, and then similarly the Z and Y coordinates reset and increased as related to the X-coordinate, and so on, thereby allocating the virtual data blocks in sequence according to increasing coordinates. Further, typically, as shown in FIG. 7, the storage block 60 to which the virtual data and parity blocks are allocated is selected one by one from every disk drive 70.

Accordingly, when the virtual data blocks related to the $Y_1$-coordinates from among the virtual data blocks belonging to the block plane $BX_4$ are completely allocated, i.e., when the virtual data blocks belonging to the block plane $BY_1$ are completely allocated to the storage blocks 60, the virtual parity block $PY_1$ for the block plane $BY_1$ is allocated to the next storage block 60. Thereafter, the allocation about the virtual data blocks related to the $Y_2$- and $Y_3$-coordinates from among the virtual data blocks belonging to the block plane $BX_4$ is performed in the same manner, and then the virtual parity blocks $PY_2$ and $PY_3$ for the block planes $BY_2$ and $BY_3$ are allocated to the next storage blocks 60, respectively.

Thereafter, when the virtual data blocks related to the $Y_4Z_1$-coordinates from among the virtual data blocks belonging to the block plane $BX_4$ are completely allocated, i.e., when the virtual data blocks belonging to the block plane $BZ_1$ are completely allocated to the storage blocks 60, the virtual parity block $PZ_1$ for the block plane $BZ_1$ is allocated to the next storage block 60. Thereafter, the allocation about the virtual data blocks related to the $Y_4Z_2$- and $Y_4Z_3$-coordinates from among the virtual data blocks belonging to the block plane $BX_4$ is performed in the same manner, and then the virtual parity blocks $PZ_2$ and $PZ_3$ for the block planes $BZ_2$ and $BZ_3$ are allocated to the next storage blocks 60, respectively.

Finally, the virtual data block related to the $X_4Y_4Z_4$-coordinate is allocated to the storage block 60, and then the virtual parity blocks $PX_4$, $PY_4$ and $PZ_4$ for the block planes $BX_4$ and $BY_4$ and $BZ_4$ are allocated to the next storage blocks 60, respectively. Therefore, in FIG. 2, operations 1 through 4, allocate the storage blocks 60 of the disk drives 70 according to the virtual data and parity blocks represented by the three-dimensional block matrix to store data and parity information therein, such that one virtual parity block plane (e.g., $Px_1$ through $Px_4$) can be taken as one parity group in checking the parity information.

At operation 5, the parity information is calculated based upon data stored in the storage blocks 60 corresponding to the virtual data blocks of each virtual data block plane. Typically, the parity information is calculated by a bitwise operator performing an exclusive OR (XOR) operation between the data stored in the storage blocks 60 corresponding to the virtual data blocks of one block plane. For example, the data stored in the data blocks corresponding to the virtual data blocks belonging to the block plane $BX_1$, which is designated in FIG. 4 by a bold line, can be as follows.

$X_1Y_1Z_1=01, X_1Y_1Z_2=10, X_1Y_1Z_3=01, X_1Y_1Z_4=00,$ $X_1Y_2Z_1=01, X_1Y_2Z_2=00, X_1Y_2Z_3=01, X_1Y_2Z_4=00,$ $X_1Y_3Z_1=10, X_1Y_3Z_2=11, X_1Y_3Z_3=00, X_1Y_3Z_4=01,$ $X_1Y_4Z_1=10, X_1Y_4Z_2=00, X_1Y_4Z_3=11, X_1Y_4Z_4=10,$

In the above example data storage, sixteen data bits in the virtual data block plane $BX_1$ are grouped by a bitwise method. The grouped data bits are counted and if the total number of "1"s is odd, the parity information is set to 0. Oppositely, if the total number of "0"s is even, the parity information is set to 1. Therefore, in this example, the parity information for the virtual block plane $BX_1$ is 10. At operation 6, the calculated parity information is stored in the storage blocks 60 corresponding to the virtual parity blocks for the virtual data block planes, respectively. For example, the parity information for the virtual data block plane $BX_1$ is stored in the parity block $PX_1$. Therefore, as shown in FIG. 7, the operations 1 through 6 allow arraying in the disk drive 70 data and corresponding parity information.

An error block recovering method, according to an embodiment of the present invention, will be described with reference to FIGS. 8 and 9. When an error block occurs in the storage blocks 60, which are allocated for the data and the parity information according to the present invention, the error block is recovered through the parity blocks corresponding to the virtual parity blocks related to the respective virtual data block planes (i.e., recovered through a parity group).

Figure 8:
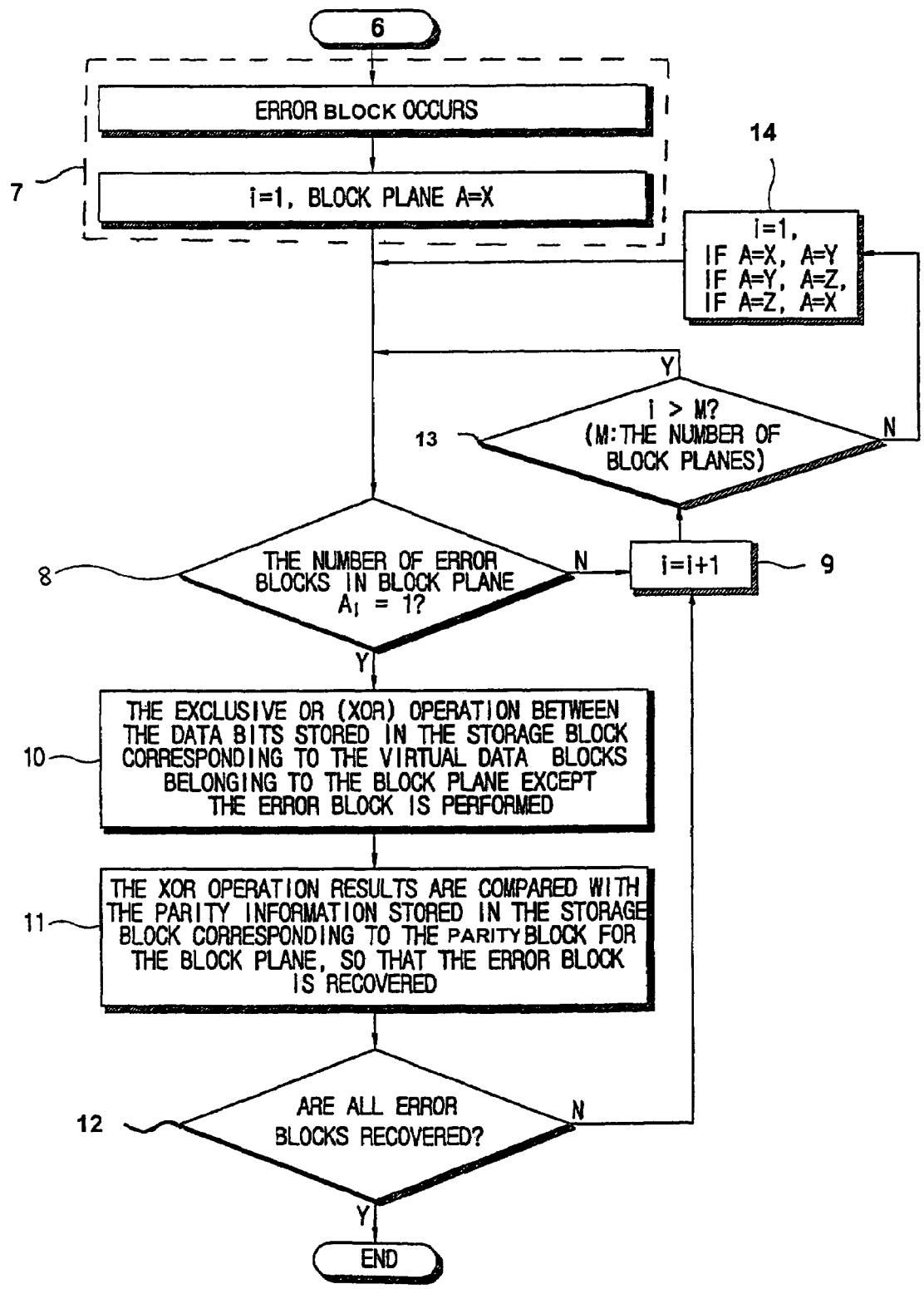
FIG. 8 is a flowchart of recovering an error block, according to an embodiment of the present invention.

Referring to FIG. 8, when, at operation 7, the error block occurs at operation 8, it is determined whether one error block occurs in a virtual data block plane. When no error block occurs or two or more error blocks occur in a virtual data block plane, the present process skips to the next operation 9. When determined at operation 8 that one error block occurs in a virtual data block plane, at operation 10, the exclusive OR (XOR) operation is performed between the data bits stored in the storage blocks 60 corresponding to the virtual data blocks belonging to the block plane except for the error block. Then, at operation 11, the XOR operation results are compared with the parity information stored in the storage block 60 corresponding to the virtual parity block (for example $PX_1$) for the virtual data block plane (for example $BX_1$), thereby recovering the error block. At operation 12, it is determined whether all error blocks are recovered, and operations 7 through 11 are repeatedly applied to the virtual data block planes related to the X, Y and Z-coordinates until all error blocks are completely recovered.

Figure 9:
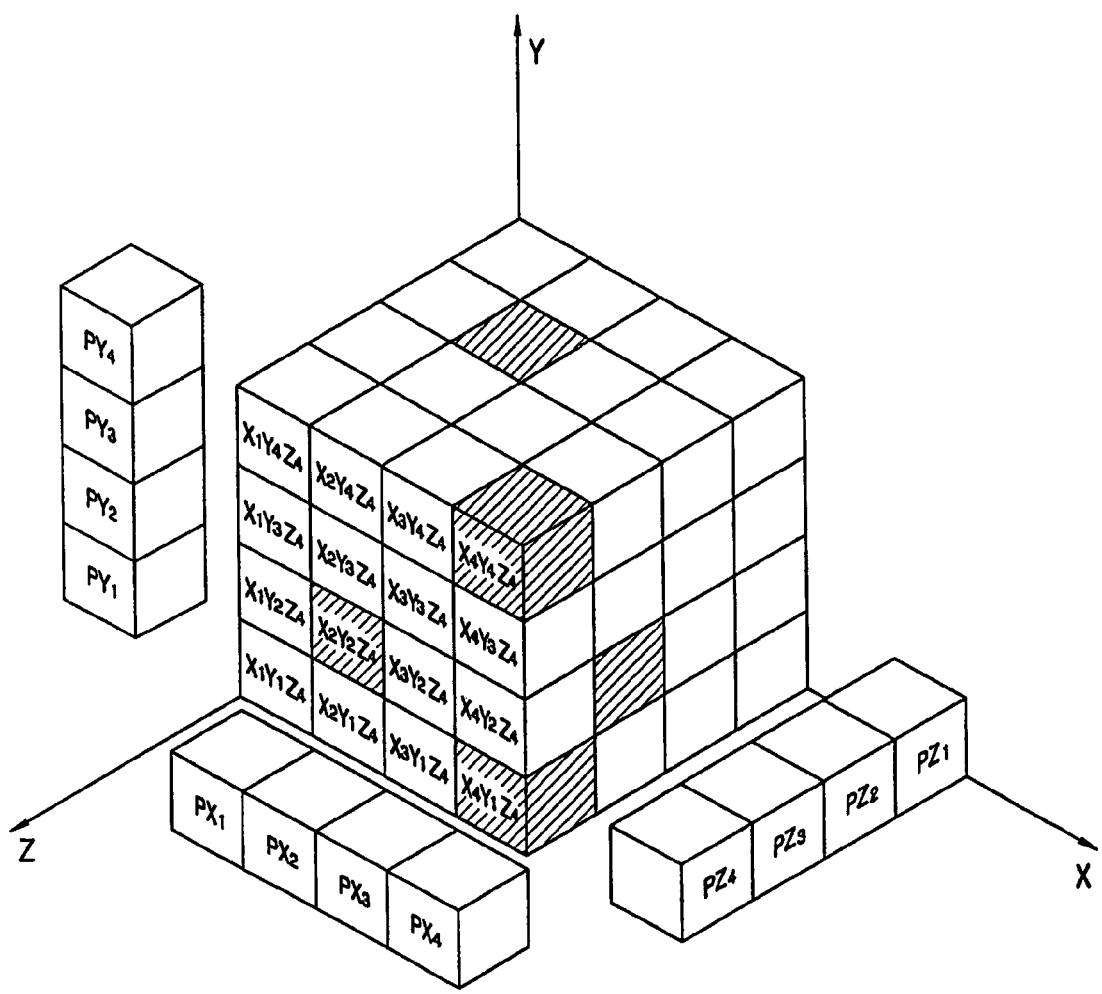
FIG. 9 illustrates some error blocks generated and represented in the virtual data blocks by way of an example to explain the error block recovery method of the present invention as shown in FIG. 8.

With reference to FIG. 9, recovery of some error blocks will be described as an example, using the above-described error block recovering method. In FIG. 9, the hatched blocks designate the error blocks, and the coordinates of the error blocks are $X_2Y_2Z_4, X_2Y_4Z_2, X_4Y_1Z_4, X_4Y_2Z_3$ and $X_4Y_4Z_4$, respectively. First, at operation 7, the total number of the error blocks belonging to the virtual data block planes $BX_1$, $BX_2$, $BX_3$ and $BX_4$ are counted in sequence and counters are initialized, such as the counter i counting the number of virtual data block planes M and the plane counter A counting the virtual data block planes. Operations 8, 9, 13 and 14 allow recovery of all error blocks by using the three-dimensional block matrix and recovering the error blocks, respectively, from each virtual data block plane having only one error block at a time until all error blocks are recovered.

For example, in FIG. 9, the total numbers of the error blocks are zero, two, zero, three, respectively, for each virtual data block plane $BX_1, BX_2, BX_3$ and $BX_4$ so that, at operation 8, the process skips to the next process 9. However, the total number of the error blocks belonging to the virtual data block plane $BY_1$ is one, so that the error block recovering operations of 10 and 11 are performed. That is, the exclusive OR (XOR) operation between the data bits stored in the storage block 60 corresponding to the virtual data blocks belonging to the block plane $BY_1$ except for the error block $X_4Y_1Z_4$ is performed, and then each XOR operation result is compared with the parity information stored in the storage blocks 60 corresponding to the virtual parity block $PY_1$ for the virtual data block plane $BY_1$. When the XOR operation results are equal to the parity information, the parity information is set to 0, whereas when the XOR operation results are not equal to the parity information, the parity information is set to 1. Then, the set parity information is stored in the data block corresponding to the error block $X_4Y_1Z_4$, thereby recovering the error block.

Then, at operations 8, 9, 13, and 14, the total numbers of the error blocks belonging to the virtual data block planes $BY_2$, $BY_3$, $BY_4$ and $BZY_1$ are counted in sequence. In this example, the total numbers of the error blocks are two, zero, two, zero, respectively, so that, again, at operation 8, the present process skips to the next process 9. However, the total number of the error blocks belonging to the virtual data block plane $BZ_2$ is one, so that the error block recovering operations of 10 and 11 are performed. That is, the exclusive OR (XOR) of the data bits stored in the storage blocks 60 corresponding to the virtual data blocks belonging to the block plane $BZ_2$ except for the error block $X_2Y_4Z_2$ are calculated, and then the calculated exclusive disjunctions are compared with the parity information stored in the storage block 60 corresponding to the virtual parity block $PZ_2$ for the virtual data block plane $BZ_2$. When the calculated exclusive disjunctions are equal to the parity information, the parity information is set to 0. When the calculated exclusive disjunctions are not equal to the parity information, the parity information is set to 1. Then, the set parity information is stored in the data block corresponding to the error block $X_2Y_4Z_2$, thereby recovering the error block.

The total number of the error blocks belonging to the virtual data block plane $BZ_3$ is also one, so that the above-described error block recovering operations of 10 and 11 are performed, thereby recovering the data block corresponding to the error block $X_4Y_2Z_3$. The total number of the error blocks belonging to the virtual data block plane $BZ_4$ is still two, even though the error block $X_4Y_1Z_4$ has been recovered, so that, at operation 8, the process skips to the next process 9. Although the above-described processes have been performed for all virtual data block planes, at operation 12, it is determined that error blocks still remain to be recovered. Therefore, the above-described processes are repeated again, thereby recovering the error block $X_2Y_2Z_4$ belonging to the virtual data block plane $BX_2$, and thereafter recovering the error block $X_4Y_4Z_4$ belonging to the virtual data block plane $BX_4$.

If the error block occurs in the parity block storing the parity information therein, the error block restoring operations 10 and 11 for the storage blocks 60 corresponding to the virtual data blocks belonging to the block plane related to the error parity block are first performed, according to the operation 8 condition/rule, and then the exclusive OR (XOR) of the data bits stored in the storage blocks 60 corresponding to the virtual data blocks belonging to the virtual data block plane related to the error parity block are calculated. Then, the parity information based on the calculated exclusive disjunction is stored in the error parity block, thereby recovering the error block occurring in the parity block. Thus, all error blocks are completely recoverable.

In the above-described embodiment, the three-dimensional block matrix constructed by virtual data blocks is formed on Cartesian coordinates (X, Y, Z). However, any virtual coordinates can be used if it allows one data block of a disk drive to be related to three parity information blocks (i.e., a parity group). Further, in the above-described embodiment, the three-dimensional block matrix is a type of "M×M×M", forming a regular hexahedron. However, the three-dimensional block matrix may be a type of "A×B×C", where A, B and C are arbitrarily integers, respectively. Further, in the above-described embodiment, the block plane $BX_i$ is defined as the virtual data block groups belonging to one $X_i$-coordinate. However, a block plane can be variously defined to distinguish from parallel planes with an X-Y plane, a Y-Z plane and a Z-X plane designation.

In the above-described embodiment, as soon as the virtual data blocks belonging to one block plane are completely allocated to the storage blocks of the disk drives, the virtual parity block for the one block plane is allocated to the next storage block of the disk drive. However, after the virtual data blocks belonging to each block plane are completely allocated to the storage blocks of the disk drives, the virtual parity block for the each block plane may be allocated to the storage block of the disk drive at any time.

In the above-described embodiment, the storage blocks of a disc driver to which the virtual data and parity blocks are allocated are selected one by one from every disk drive, in sequence. However, the storage blocks may be selected regardless of a physical location of each disk drive, if the storage blocks are selected one by one from every disk drive. Further, in the above-described embodiment, the error block recovering operations are performed in alphabetical order of the virtual data block planes related to the X, Y and Z-coordinates. However, the error block recovering operations may be randomly performed.

As described above, the present invention provides a parity storing method and an error block recovering method in an external storage subsystem, which allows a plurality of error blocks to be recovered, and more particularly, allows three or more error blocks per one parity information group to be recovered, thereby improving reliability and performance. Although in the above-described example embodiments virtual parity block planes are allocated to virtual data block planes of a virtual three-dimensional matrix to recover error blocks in disk drive storage blocks, the present invention is not limited to such a configuration, and any error information, such as checksum, etc., as error information block planes may be allocated to the virtual data block planes. The above-described processes of the invention are embodied in a computing device, such as a computer, a storage device, etc., and can be implemented in software and/or computing hardware.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A parity storing method in an external storage subsystem comprising multiple disk drives including a plurality of storage blocks, comprising:
    determining a number of the storage blocks to be used as data blocks and a number of the storage blocks to be used as parity blocks in a total number of storage blocks of the disk drives;
    forming a three-dimensional block matrix of virtual data blocks corresponding to the determined number of the storage blocks to be used as the data blocks on Cartesian coordinates (X, Y, Z);
    allocating virtual parity blocks to block planes related to the X, Y and Z-coordinates of the three-dimensional block matrix, respectively;
    allocating the virtual data blocks and the virtual parity blocks to the storage blocks of the disk drives, respectively;
    calculating parity information based upon data bits respectively stored in the storage blocks corresponding to the virtual data blocks of every block plane; and
    storing the calculated parity information in the storage blocks corresponding to the virtual parity blocks for every block plane, respectively.

2. The parity storing method according to claim 1, wherein the number of the storage blocks to be used as data blocks and the number of the storage blocks to be used as parity blocks are determined by calculating a maximum integer M satisfying $K \geq M^3 - 3M$, where K is the total number of storage blocks of the disk drives, so that the number of the data blocks is defined as $M^3$ and the number of the parity blocks is defined as 3M and the three-dimensional block matrix is a type of M×M×M.

3. An error block recovering method in an external storage subsystem comprising multiple disk drives including a plurality of storage blocks, comprising:

storing data and parity information by the parity storing method according to claim 2; and recovering a plurality of error blocks by using the parity blocks corresponding to the virtual parity blocks related to the respective block planes with the error blocks of X, Y and Z-coordinates.

4. The error block recovering method according to claim 3, wherein the recovering the plurality of error blocks comprises:

counting the total numbers of the error blocks occurring in the block planes, respectively;

skipping the block planes with no error blocks or with two or more error blocks each block plane with one error block;

recovering the one error block by comparing XOR operation results with the parity information stored in the storage block corresponding to the parity block for the block plane; and repeating the above recovering operations in regular order of the X, Y and Z-coordinates.

5. The parity storing method according to claim 1, wherein the allocating of the virtual data blocks and the virtual parity blocks to the storage blocks of the disk drives is performed by allocating the virtual parity block for each block plane to the storage block of the disk drive after the virtual data blocks belonging to each block plane are completely allocated to the storage blocks of the disk drives.

6. An error block recovering method in an external storage subsystem comprising multiple disk drives including a plurality of storage blocks, comprising:

storing data and parity information by the parity storing method according to claim 5; and recovering a plurality of error blocks by using the parity blocks corresponding to the virtual parity blocks related to the respective block planes with the error blocks of X, Y and Z-coordinates.

7. The error block recovering method according to claim 6, wherein the recovering the plurality of error blocks comprises:

counting the total numbers of the error blocks occurring in the block planes, respectively;

skipping the block planes with no error blocks or with two or more error blocks performing an exclusive OR (XOR) operation between the data bits stored in the storage blocks, except for an error block, corresponding to the virtual data blocks belonging to the block plane with one error block;

recovering the one error block by comparing XOR operation results with the parity information stored in the storage block corresponding to the parity block for the block plane; and repeating the above recovering operations in regular order of the X, Y and Z-coordinates.

8. The parity storing method according to claim 1, wherein the calculating of the parity information is performed by a bitwise operator performing exclusive OR (XOR) operation between the data bits stored in the storage blocks corresponding to the virtual data blocks of each block plane.

9. An error block recovering method in an external storage subsystem comprising multiple disk drives including a plurality of storage blocks, comprising:

storing data and parity information by the parity storing method according to claim 8; and recovering a plurality of error blocks by using the parity blocks corresponding to the virtual parity blocks related to the respective block planes with the error blocks of X, Y and Z-coordinates.

10. The error block recovering method according to claim 9, wherein the recovering the plurality of error blocks comprises:

counting the total numbers of the error blocks occurring in the block planes, respectively;

skipping the block planes with no error blocks or with two or more error blocks performing an exclusive OR (XOR) operation between the data bits stored in the storage blocks, except for an error block, corresponding to the virtual data blocks belonging to the block plane with one error block;

recovering the one error block by comparing XOR operation results with the parity information stored in the storage block corresponding to the parity block for the block plane; and repeating the above recovering operations in regular order of the X, Y and Z-coordinates.

11. An error block recovery method in an external storage subsystem comprising multiple disk drives including a plurality of storage blocks, comprising:

storing data and parity information by the parity storing method according to claim 1; and recovering a plurality of error blocks by using parity blocks corresponding to the virtual parity blocks related to the respective block planes with the error blocks of X, Y and Z-coordinates.

12. The error block recovering method according to claim 11, wherein the recovering the plurality of error blocks comprises:

counting the total numbers of the error blocks occurring in the block planes, respectively;

skipping the block planes with no error blocks or with two or more error blocks performing an exclusive OR (XOR) operation between the data bits stored in the storage blocks, except for an error block, corresponding to the virtual data blocks belonging to each block plane with one error block;

recovering the one error block by comparing XOR operation results with the parity information stored in the storage block corresponding to the parity block for the block plane; and repeating the above recovering operations in regular order of the X, Y and Z-coordinates.

13. A machine readable storage comprising multiple disk drives each comprising a plurality of storage blocks, the storage comprising:

a programmed computer processor associating storage blocks of the disk drives to a virtual three-dimensional block matrix of virtual data blocks with virtual parity blocks allocated to each virtual data block plane, and controlling data input/output to/from the disk drives.

14. The storage of claim 13, wherein the programmed computer processor further calculates parity information based upon the data bits respectively stored in the storage blocks corresponding to the virtual data blocks of each virtual data block plane.

15. The storage of claim 13, wherein the programmed computer processor further recovers any number of error blocks in the storage blocks according to the virtual parity blocks corresponding to each virtual data block plane.

16. The storage of claim 15, wherein the programmed computer processor recovers the error blocks by repetitively:

counting a total number of the error blocks occurring in the virtual data block planes, respectively, skipping the virtual data block planes with no error blocks or with two or more error blocks, performing an exclusive OR (XOR) operation between the data bits stored in the storage blocks, except for an error block, corresponding to the virtual data blocks belonging to the virtual data block plane with one error block, and recovering the one error block by comparing the XOR operation results with the parity information stored in the storage block corresponding to the virtual parity block for the virtual data block plane.

17. The storage of claim 13, wherein the programmed computer processor generates the virtual three-dimensional block matrix by calculating a maximum integer M satisfying $K \geqq M^3+3M$, where K is the total number of storage blocks of the disk drives, $M^3$ is a number of the storage blocks used as data blocks, and 3M is a number of the storage blocks used as parity blocks, and the three-dimensional block matrix is M×M×M.

18. The storage of claim 13, wherein the programmed computer processor associates the storage blocks of the disk drives to the virtual three-dimensional block matrix by:
   determining a number of the storage blocks to be used as data blocks and a number of the storage blocks to be used as parity blocks in a total number of storage blocks of the disk drives,
   generating the three-dimensional block matrix of the virtual data blocks corresponding to the determined number of the storage blocks to be used as the data blocks on Cartesian coordinates (X, Y, Z),
   allocating the virtual parity blocks to the virtual data block planes related to the X, Y and Z-coordinates of the three-dimensional block matrix, respectively,
   allocating the virtual data blocks and the virtual parity blocks to the storage blocks of the disk drives, respectively,
   calculating parity information based upon the data bits respectively stored in the storage blocks corresponding to the virtual data blocks of every virtual data block plane, and
   storing the calculated parity information in the storage blocks corresponding to the virtual parity blocks for every virtual data block plane, respectively.

19. A machine readable storage system, comprising:
   a redundant array of independent disks (RAID) comprising disk drives each having a plurality of storage blocks;
   a host computer processing data and requesting data input/output of the disk drives;
   a controller in communication with the host computer and the RAID, and controlling the RAID operations according to a process of associating storage blocks of the disk drives to a virtual three-dimensional block matrix of virtual data blocks with virtual parity blocks allocated to each virtual data block plane.

20. The system of claim 19, wherein the controller further calculates parity information based upon the data bits respectively stored in the storage blocks corresponding to the virtual data blocks of each virtual block plane.

21. The system of claim 19, wherein the controller further recovers any number of error blocks in the storage blocks according to the virtual parity blocks corresponding to each virtual data block plane.

22. A method, comprising:
   allocating storage blocks of disk drives according to a virtual three-dimensional block matrix of virtual data blocks and virtual parity block planes corresponding to each virtual data block plane to store data and parity information in the storage blocks of the disk drives; and
   using the virtual parity plane and the corresponding virtual data block plane to recover any number of error blocks in the corresponding allocated storage blocks.

23. A machine readable storage comprising multiple disk drives each comprising a plurality of storage blocks, the storage comprising:
   a programmed computer processor associating storage blocks of the disk drives to a virtual three-dimensional block matrix of virtual data blocks with virtual error information blocks allocated to each virtual data block plane, and recovering any number of error blocks in the storage blocks according to the error information blocks corresponding to each virtual data block plane.

* * * * *

UNITED STATES PATENT AND TRADEMARK OFFICE
CERTIFICATE OF CORRECTION

PATENT NO.         : 7,398,459 B2
APPLICATION NO.    : 10/693986
DATED              : July 2, 2008
INVENTOR(S)        : Hyun-ho Park et al.

It is certified that error appears in the above-identified patent and that said Letters Patent is hereby corrected as shown below:

Column 8, Line 60 Claim 2, change "$K \geq M^3 - 3M$" to --$K \geq M^3 + 3M$--.

Signed and Sealed this

Fourth Day of November, 2008

JON W. DUDAS
*Director of the United States Patent and Trademark Office*

UNITED STATES PATENT AND TRADEMARK OFFICE
CERTIFICATE OF CORRECTION

PATENT NO. : 7,398,459 B2
APPLICATION NO. : 10/693986
DATED : July 8, 2008
INVENTOR(S) : Hyun-ho Park et al.

It is certified that error appears in the above-identified patent and that said Letters Patent is hereby corrected as shown below:

Column 8, Line 60 Claim 2, change "$K \geq M^3 - 3M$" to --$K \geq M^3 + 3M$--.

This certificate supersedes the Certificate of Correction issued November 4, 2008.

Signed and Sealed this

Twenty-fifth Day of November, 2008

JON W. DUDAS
*Director of the United States Patent and Trademark Office*